United States Patent
Ferguson

(10) Patent No.: US 9,873,510 B2
(45) Date of Patent: Jan. 23, 2018

(54) CONTOURED STOWABLE SEAT

(71) Applicant: AMI Industries, Inc., Colorado Springs, CO (US)

(72) Inventor: Keith M. Ferguson, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 15/083,532

(22) Filed: Mar. 29, 2016

(65) Prior Publication Data

US 2017/0283072 A1 Oct. 5, 2017

(51) Int. Cl.
*B64D 11/06* (2006.01)

(52) U.S. Cl.
CPC ........ *B64D 11/0698* (2014.12); *B64D 11/062* (2014.12); *B64D 11/064* (2014.12); *B64D 11/0691* (2014.12)

(58) Field of Classification Search
CPC .. A47C 9/06; B64D 11/0698; B64D 11/0691; B64D 11/062; B64D 11/064
USPC .................................. 297/14, 380
See application file for complete search history.

(56) References Cited

U.S. PATENT DOCUMENTS

| | | | |
|---|---|---|---|
| 4,437,629 A | 3/1984 | Roine | |
| 4,460,215 A * | 7/1984 | Chamberlain | A47C 9/06 297/14 |
| 4,902,069 A * | 2/1990 | Lehnert | B64D 11/0691 297/14 |
| 9,180,793 B2 | 11/2015 | Carlin et al. | |
| 2010/0078974 A1 | 4/2010 | Nathan | |

OTHER PUBLICATIONS

EP Extended Search report dated Aug. 2, 2017 in EP Application No. 17163593.1.

* cited by examiner

*Primary Examiner* — Milton Nelson, Jr.
(74) *Attorney, Agent, or Firm* — Snell & Wilmer, L.L.P.

(57) ABSTRACT

A contoured stowable seat is provided. The contoured stowable seat may comprise a housing, a seat pan, a contoured backrest, and a deployment lever. The contoured stowable seat may be configured to be in a stowed position and a deployed position. In response to the seat pan being in the deployed position, the deployment lever may contact the contoured backrest, causing the contoured backrest to deploy and form into a contoured shape. The contoured stowable seat may also further comprise a tension cord and a headrest. The contoured backrest may also further comprise a cushion located on the outer surface of the contoured backrest.

18 Claims, 5 Drawing Sheets

CONTOURED STOWABLE SEAT

FIELD

The present disclosure relates to stowable seats, and more specifically, to a contoured stowable seat having a contoured backrest.

BACKGROUND

Aircraft cabin seats are used for flight attendant safety and comfort during taxi, takeoff, landing, and inflight rest periods. Useable volumetric space on an aircraft may be limited and seats should not hinder ingress and egress for passengers in the event of an emergency. Aircraft cabin seats may therefore be stowed during flight and when not in use. Typical aircraft cabin seats are metallic in nature with flat backrest and seat pan frames, and contoured foam cushions placed on the frame surfaces. In order to comply with post-crash tests and to keep aisle space open and clear, aircraft cabin seats may have capabilities to completely close when stowed, and remain closed in the event of a crash. Post-crash test closures may be difficult to achieve due to the metallic frames deforming during a crash, and because of the restraint belts and buckles being sandwiched between the foam cushions in the seat pan and backrest areas.

SUMMARY

In various embodiments, a seat is disclosed. The seat may comprise a housing. A seat pan may be pivotably coupled to the housing. The seat pan may be configured to pivot from a stowed position into a deployed position. A contoured backrest may be coupled to the housing. A deployment lever may be rotatably coupled to the housing. The deployment lever may be configured to deploy the contoured backrest into a contoured shape in response to the seat pan being pivoted into the deployed position.

In various embodiments, the seat may further comprise a tension cord having a first end and a second end. The first end may couple to the housing and the second end may couple to the contoured backrest. In response to the seat pan pivoting into the deployed position, the tension cord may deploy the contoured backrest into a second contoured shape by imparting tension to a location where the second end is coupled to the contoured backrest. The seat pan and the contoured backrest may be configured to stow at least partially in the housing in response to the seat pan being in the stowed position. The seat may also comprise a contoured pad coupled to an outer surface of the contoured backrest. The contoured backrest may couple to the housing via a slidable joint, allowing the contoured backrest to slide relative to the housing in response to the seat pan pivoting into the deployed position. The seat may also comprise a headrest coupled to a top of the housing and an at least one feet coupled to a bottom of the housing. The contoured backrest may comprise a frame and a stretch material. The stretch material may couple to the frame and the frame may define an axially outer edge of the stretch material. The frame further may comprise a flex point configured to bend in a direction away from the housing, in response to the seat pan pivoting into the deployed position. The seat may also comprise a seat restraint coupled to the housing.

In various embodiments, a contoured stowable seat is disclosed. The contoured stowable seat may comprise a housing having a top and a bottom. A seat pan may pivotably couple to the housing at a position between the top and the bottom. The seat pan may be configured to pivot from a stowed position into a deployed position. A contoured backrest may comprise a frame and a stretch material. The stretch material may couple to the frame and the frame may define an axially outer edge of the stretch material. The frame may couple to the housing at a first position proximate the top of the housing and at a second position proximate where the seat pan couples to the housing. A deployment lever may have a first deployment end and a second deployment end. The second deployment end may couple to the seat pan at a location proximate the coupling of the seat pan to the housing. The first deployment end may be configured to contact the frame of the contoured backrest in response to the seat pan being in the deployed position, causing the contoured backrest to deploy into a contoured shape.

In various embodiments, the contoured stowable seat may further comprise a tension cord having a first end and a second end. The first end may couple to the housing and the second end may couple to the stretch material of the contoured backrest. In response to the seat pan pivoting into the deployed position, the tension cord may be configured to deploy the contoured backrest into a second contoured shape by imparting tension to a location where the second end is coupled to the contoured backrest. The seat pan and the contoured backrest may be configured to stow at least partially in the housing in response to the seat pan being in the stowed position. A contoured pad may couple to an axially outer surface of the stretch material of the contoured backrest. The frame of the contoured backrest may couple to the housing at the first position via a slidable joint, allowing the contoured backrest to slide relative to the housing in response to the seat pan pivoting into the deployed position. A headrest may couple to the top of the housing. The frame further may also comprise a flex point configured to bend in a direction away from the housing, in response to the seat pan pivoting into the deployed position. A seat restraint may couple to the housing.

In various embodiments, a method of operating the seat is disclosed. The method may comprise pivoting the seat pan into the deployed position. In response to the seat pan being in the deployed position the deployment lever may deploy the contoured backrest into the contoured shape. The method may also comprise pivoting the seat pan into the stowed position, wherein in response to the seat pan being in the stowed position the deployment lever may allow the contoured backrest to form into a relaxed shape.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
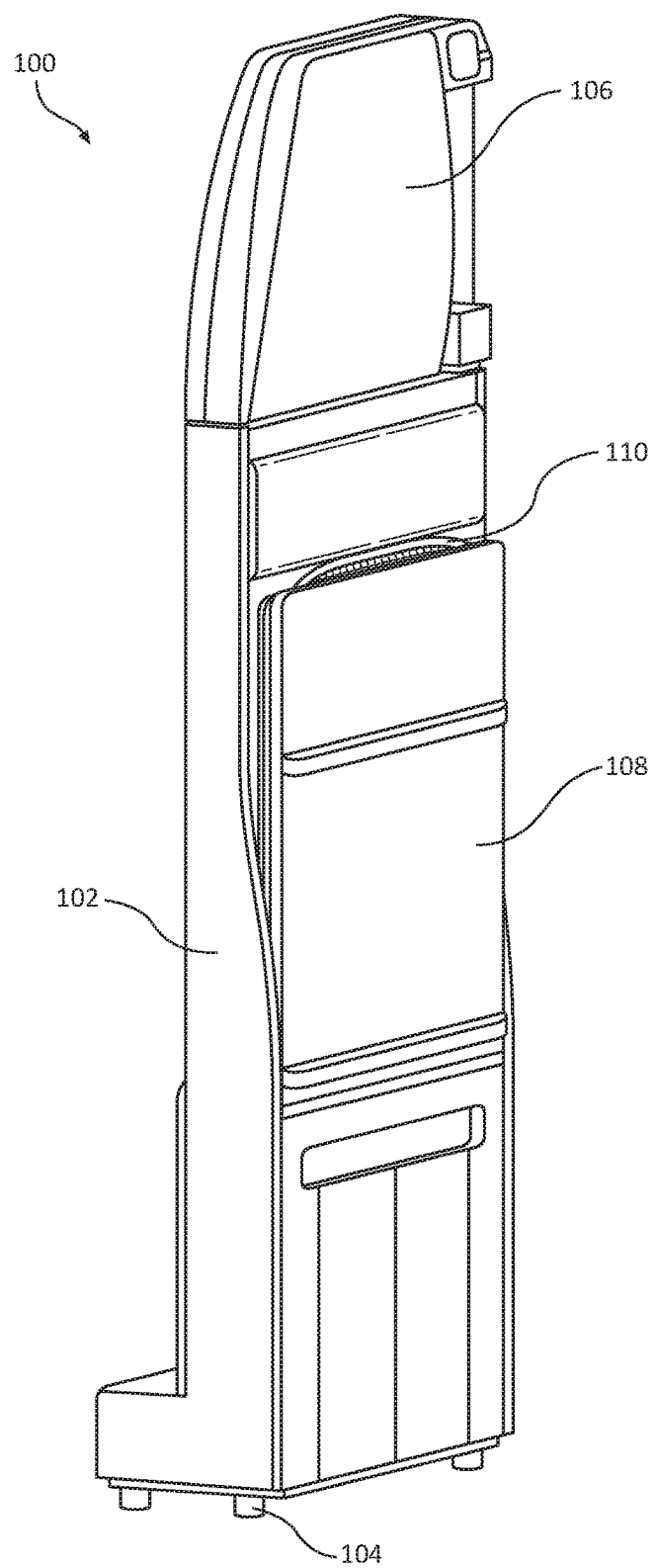
FIG. 1A illustrates a perspective view of a contoured stowable seat in a stowed position, in accordance with various embodiments.
Figure 1B:
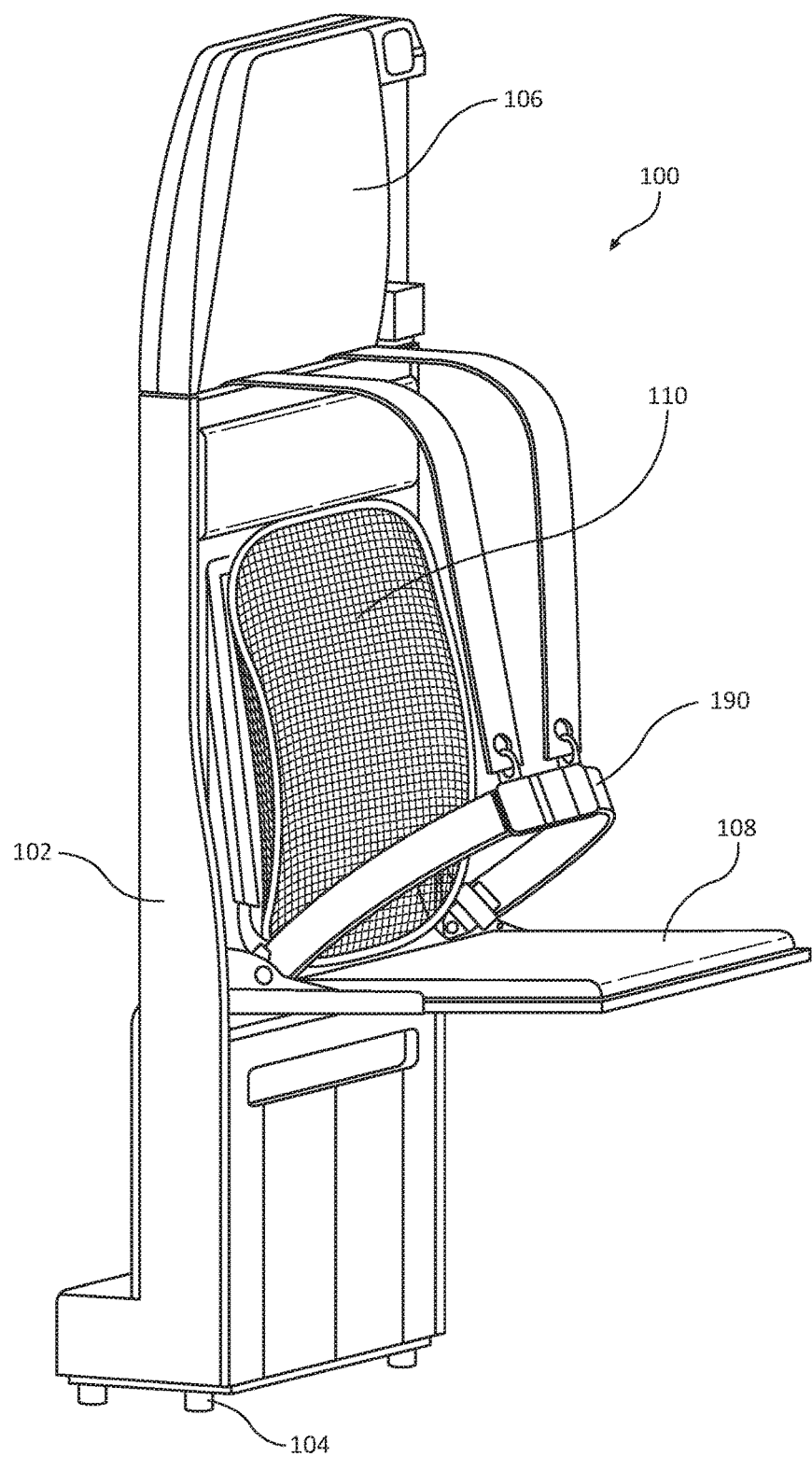
FIG. 1B illustrates a perspective view of a contoured stowable seat in a deployed position, in accordance with various embodiments.

In various embodiments, and with reference to FIGS. 1A and 1B, a contoured stowable seat 100 is disclosed. Contoured stowable seat 100 may be configured to provide a contoured backrest allowing for easier closure of a post-crash seat. Contoured stowable seat 100 may enable an easier closure of a post-crash seat by eliminating potential binding caused by metallic deformation of a metallic backrest frame. In this regard, contoured stowable seat 100 may comprise a stretch fabric or mesh material. In the stowed position, the use of a stretch fabric or mesh material may allow contoured stowable seat 100 to form a recessed pocket (e.g., as the contoured backrest goes slack), providing additional room for restraint buckles and/or a seat pan foam cushion. By providing additional room during stowage, contoured stowable seat 100 may also allow for a narrower seat in the stowed position, as less volumetric space may be needed to contain the restraint buckles and/or seat pan foam cushion. Moreover, contoured stowable seat 100 may also allow for a lighter weight backrest compared to typical stowable seats, and may also enable better lumbar support and comfort.

In various embodiments, contoured stowable seat 100 may comprise a housing 102, a plurality of feet 104, a headrest 106, a seat pan 108, and a contoured backrest 110. With reference to FIG. 1A, contoured stowable seat 100 is depicted in a stowed position with contoured backrest 110 and seat pan 108 partially stored within housing 102. Housing 102 may provide structural support to contoured stowable seat 100. Housing 102 may comprise any suitable type of material capable of providing structural support, such as, for example, machined aluminum. Housing 102 may also be reinforced to provide additional structural support, such as, for example, through the use of aluminum side spars. Feet 104 may be coupled to the bottom of housing 102, and may protrude downward from housing 102. Feet 104 may also provide a mounting point to mount contoured stowable seat 100 to a surface, such as, for example, an aircraft floor.

In various embodiments, seat pan 108 may be pivotably coupled to housing 102 such that seat pan 108 may pivot in a direction towards housing 102 in a stowed position, and in a direction away from housing 102 in a deployed position. In this regard, seat pan 108 may pivot into a position proximate contoured backrest 110 while in the stowed position. Contoured stowable seat 100 in the stowed position may occupy less space than contoured stowable seat 100 in the deployed position. Contoured stowable seat 100 may be stowed to conserve useable volume in an aircraft or other application where space may be limited. With reference to FIG. 1B, contoured stowable seat 100 is depicted in the deployed position. In this regard, seat pan 108 may be configured to pivot in a direction away from housing 102 to a deployed position substantially perpendicular with housing 102. Seat pan 108 may comprise any suitable type of seat. For example, seat pan 108 may comprise a bench seat, a bucket seat, a cushioned seat, and/or any other suitable type of seat.

In various embodiments, headrest 106 may be coupled to the top of housing 102 in a location proximate contoured backrest 110, and may protrude in a direction upward from housing 102. Headrest 106 may be configured to provide support to the head of a passenger sitting on contoured stowable seat 100 while in the deployed position. Headrest 106 may comprise any suitable type of head rest. For example, headrest 106 may comprise a substantially flat surface. Headrest 106 may also comprise a cushioned material. In various embodiments, headrest 106 may also be adjustable, allowing for movement away from, and back towards, housing 102.

In various embodiments, a seat restraint 190 may be configured to secure a passenger sitting in contoured stowable seat 100. Seat restraint 190 may comprise any suitable type of seat belt or restraint system and/or mechanism. Seat restraint 190 may be coupled at a first end to housing 102 at a position above contoured backrest 110, and at a second end to housing 102 at a position below contoured backrest 110, such as, at the position seat pan 108 pivotably couples to housing 102. Seat restraint 190 may also be coupled at the second end to seat pan 108.

In various embodiments, contoured backrest 110 may couple to housing 102 at a first position proximate to headrest 106, and at a second position proximate to seat pan 108. Contoured backrest 110 may couple to housing 102 using any suitable technique, such as, for example, through a pivot joint. Contoured backrest 110 may also couple to housing 102 at the first position through a slidable joint. In this regard, the slidable joint may enable contoured backrest 110 to move towards the headrest 106 when in the stowed position, and slide towards feet 104 when in the deployed position. Use of the slidable joint may therefore allow contoured backrest 110 to slide down when contoured backrest 110 is in a stretched, contoured position (the deployed position), and slide back when contoured backrest 110 is in a relaxed position (the stowed position).

Figure 2:
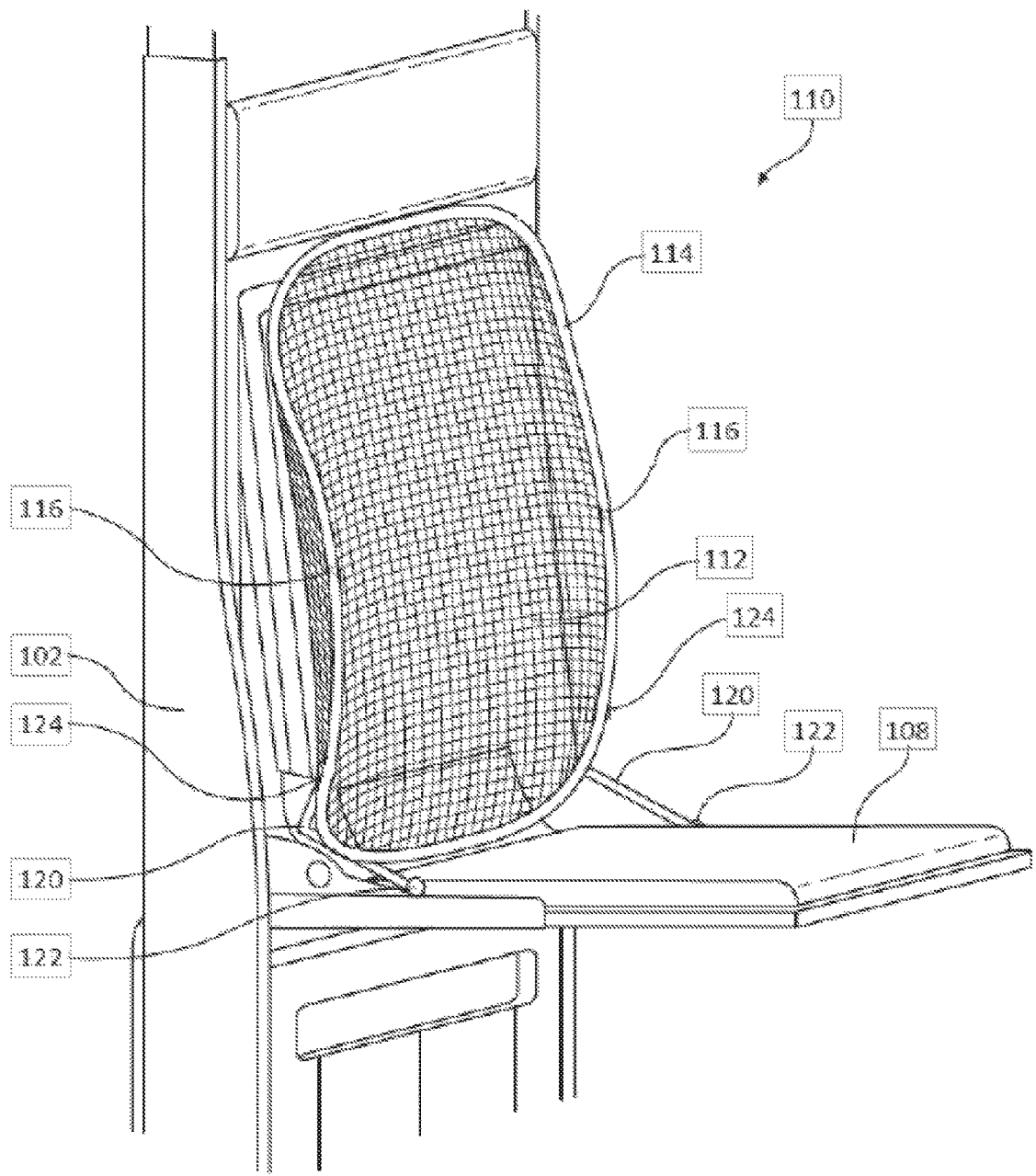
FIG. 2 illustrates a perspective view of a contoured stowable seat, in accordance with various embodiments.

In various embodiments, and with reference to FIG. 2, contoured backrest 110 is depicted in greater detail. Contoured backrest 110 may comprise a frame 114 and a stretch backrest 112. Frame 114 may be configured to provide structural support to contoured backrest 110. Frame 114 may comprise a full hoop design, defining the entire outer edges of contoured backrest 110. Frame 114 may also comprise a partial design, such as two parallel frames, defining only the outer sides of contoured backrest 110. Frame 114 may comprise any suitable material capable of providing structural support. For example, frame 114 may comprise aluminum, carbon fiber, and/or an injection molded plastic.

In various embodiments, frame 114 may comprise a flex point 116. Flex point 116 may comprise a portion of frame 114 that has been weakened to allow frame 114 to bend in a direction away from housing 102, such as when contoured stowable seat 100 is in the deployed position. Flex point 116 may comprise a portion of frame 114 that is weakened to allow the partial bending of frame 114, but not weakened to the point that frame 114 may easily break while bending. In this regard, flex point 116 may comprise a portion of frame 114 that has been weakened by deformation, thinning of material, notching of the surface, and/or through any other suitable technique.

In various embodiments, stretch backrest 112 may be coupled to frame 114. Stretch backrest 112 may couple to frame 114 using any suitable technique. For example, stretch backrest 112 may be coupled to frame using a fastener, adhesive, and/or the like. In various embodiments, frame 114 may comprise an interior channel configured to receive stretch backrest 112. In this regard, stretch backrest 112 may be inserted and crimped within the interior channel of frame 114, coupling stretch backrest 112 to frame 114. Stretch backrest 112 may comprise any suitable material. For example, stretch backrest 112 may comprise a flame retardant mesh material. Stretch backrest 112 may also comprise a nylon mesh material, a two-way stretch material, and/or any other suitable material. For example, stretch backrest 112 may comprise an elastomeric fiber material such as Lycra®, Spandex, and/or Elastane.

In various embodiments, contoured stowable seat 100 may also comprise a deployment lever 120 configured to deploy contoured backrest 110 into a contoured shape when seat pan 108 is in a deployed position. Deployment lever 120 may be coupled to housing 102 at a proximate position below contoured backrest 110. Deployment lever 120 may be coupled to housing 102 using a pivot joint, or other such similar mechanism allowing rotational movement of deployment lever 120 while coupled to housing 102. Deployment lever 120 may comprise any suitable shape and size capable of deploying contoured backrest 110 into a contoured shape. In this regard, deployment lever 120 may comprise a wishbone shape, or any other suitable shape having an angle.

In various embodiments, deployment lever 120 may comprise a first deployment end 122 and a second deployment end 124. First deployment end 122 may be coupled to seat pan 108. In this regard, first deployment end 122 may be coupled to seat pan 108 such that first deployment end 122 may rotatably move with seat pan 108 when contoured stowable seat 100 is in the deployed and/or the stowed position. Second deployment end 124 may be configured as a mechanism to deploy contoured backrest 110 into a contoured shape. In this regard, second deployment end 124 may be located in close proximity to frame 114. In response to seat pan 108 being in the deployed position, second deployment end 124 may be pushed into contact against frame 114, forming contoured backrest 110 into a contoured shape. In various embodiments, contact from second deployment end 124 against frame 114 may also cause flex point 116 to bend in a direction away from housing 102, creating further contour on contoured backrest 110. In response to seat pan 108 being in a stowed position, second deployment end 124 may be moved away from frame 114 (towards housing 102) such that contoured backrest 110 may form into a relaxed shape.

Figure 3:
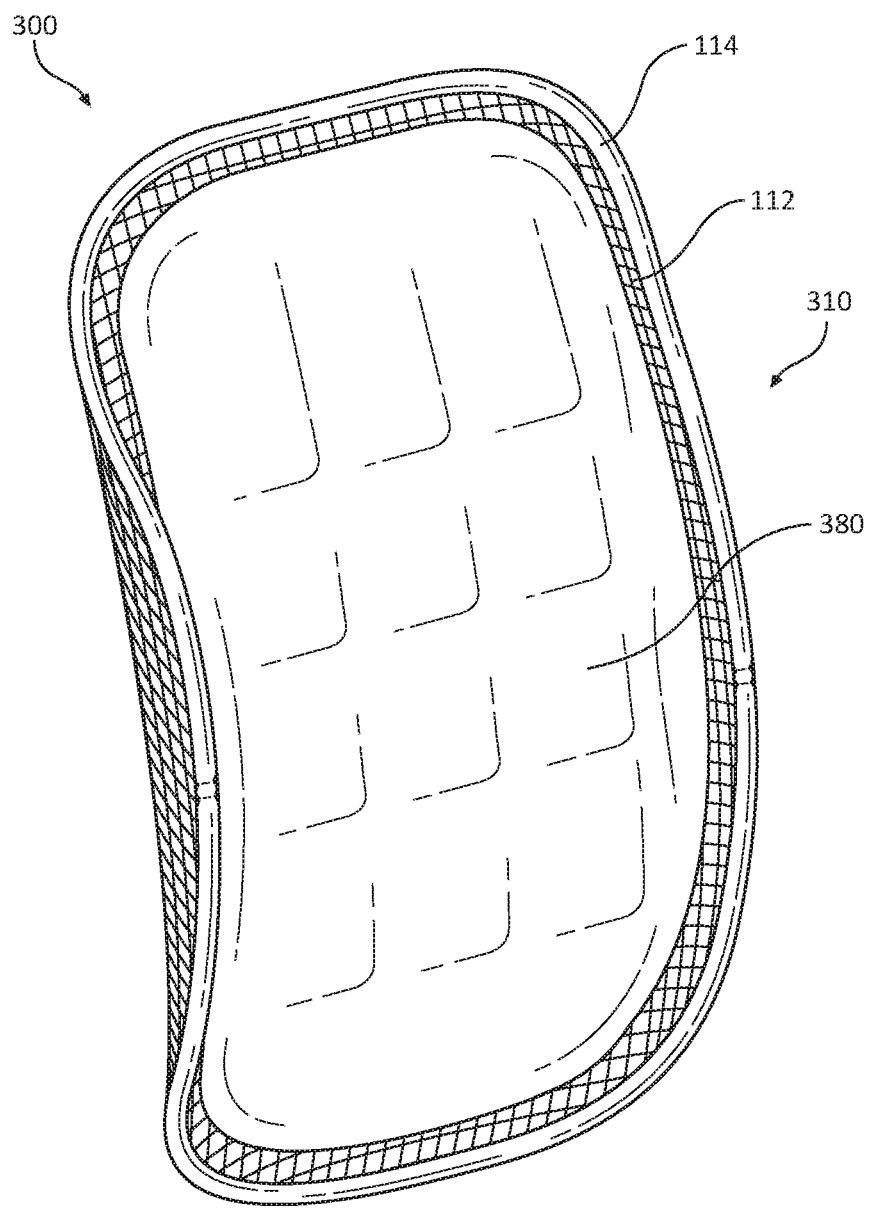
FIG. 3 illustrates a perspective view of a contoured backrest having a back cushion, in accordance with various embodiments.

In various embodiments, and with reference to FIG. 3, a contoured backrest 310 may also be configured to comprise a contoured pad 380. Contoured pad 380 may be coupled to the outer surface of contoured backrest 310. In this regard, contoured pad 380 may be coupled to the outer surface of stretch backrest 112, in a position away from housing 102. Contoured pad 380 may be coupled to the outer surface of stretch backrest 112 using any suitable technique. For example, contoured pad 380 may be coupled to the outer surface of stretch backrest 112 using an adhesive, through stitching, and/or through any other suitable method. Contoured pad 380 may comprise any suitable material and/or coating. For example contoured pad 380 may comprise a foam cushion. Contoured pad 380 may also be covered with any desired material, such as cloth, leather, and/or the like.

Figure 4:
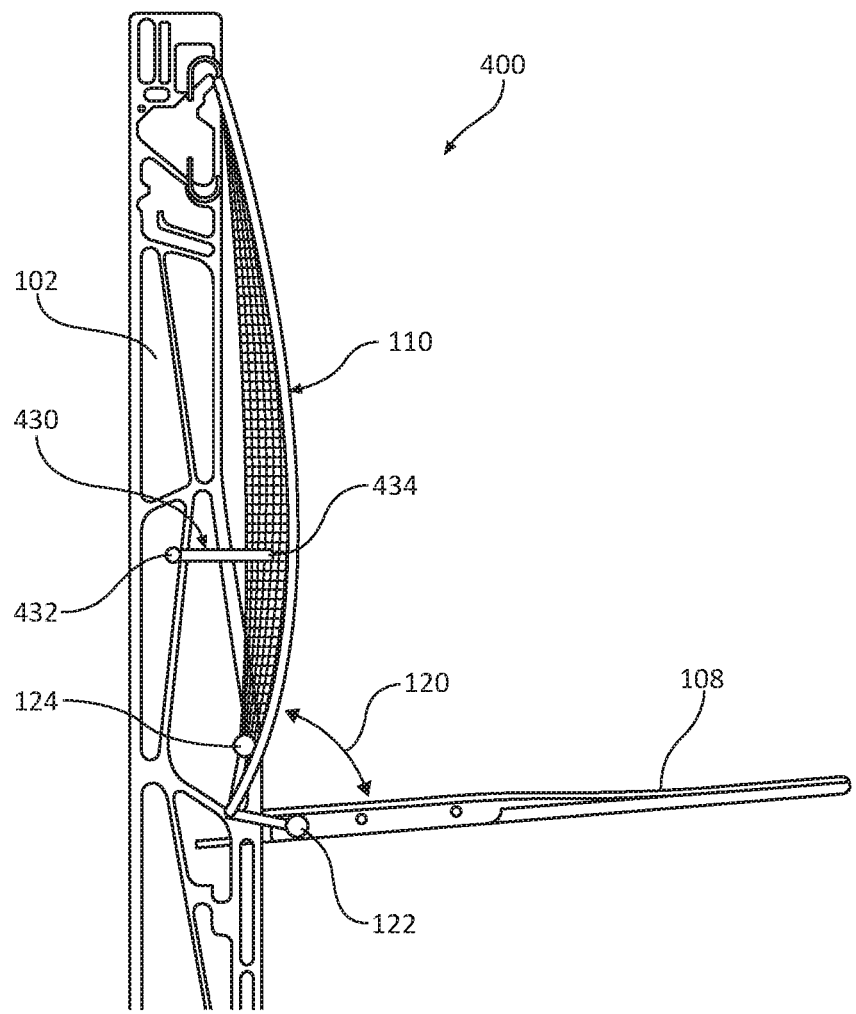
FIG. 4 illustrates a side view of a contoured stowable seat in a deployed position further comprising a tension cord, in accordance with various embodiments.

In various embodiments, and with reference to FIG. 4, a contoured stowable seat 400 may further comprise a tension cord 430. Tension cord 430 may comprise a first tension end 432 and a second tension end 434. First tension end 432 may be configured to couple to housing 102, using any suitable technique known in the art, such as via a pivot joint. First tension end 432 may couple to any desirable location on housing 102. Second tension end 434 may be configured to couple to contoured backrest 110 at any desired location, using any suitable technique known in the art. Second tension end 434 may couple to any desirable location on contoured backrest 110. Tension cord 430 may comprise any suitable material capable of imparting tension in response to contoured stowable seat 400 being in a deployed position. In this regard, tension cord 430 may comprise a pulley cord and/or other similar material having elastic properties.

In various embodiments, tension cord 430 may be configured to reinforce and provide additional contour to contoured backrest 110. In this regard, in response to contoured stowable seat 400 being in a deployed position, tension cord 430 may impart tension in the proximate area where second tension end 434 is coupled to contoured backrest 110, pulling that proximate area of contoured backrest 110 towards housing 102. In response to contoured stowable seat 400 being in a stowed position, tension cord 430 may release the tension and enable contoured backrest 110 to return to a slack form. Tension cord 430 may therefore provide further contour to contoured backrest 110 by imparting tension to desired areas of contoured backrest 110. In this regard, tension cord 430 may be used to provide greater lumbar support by forming additional contour in the lumbar region of contoured backrest 110. Tension cord 430 may also be used to provide more side bolstering to contoured backrest 110, or less predominance to contoured backrest 110. Tension cord 430 may also be used in the upper thoracic area to provide relief for shoulder blade support, or may be used in the lower center of contoured backrest 110 to provide relief for tailbone support.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat, comprising:
   a housing;
   a seat pan pivotably coupled to the housing, wherein the seat pan is configured to pivot from a stowed position into a deployed position;
   a contoured backrest coupled to the housing, wherein the contoured backrest comprises a frame defining an outer edge of the contoured backrest; and
   a deployment lever rotatably coupled to the housing, wherein in response to the seat pan being pivoted into the deployed position the deployment lever is configured to deploy the contoured backrest into a contoured shape, and wherein the frame comprises a flex point configured to bend in a direction away from the housing in response to the contoured backrest being deployed into the contoured shape.

2. The seat of claim 1, further comprising a tension cord having a first end and a second end, wherein the first end is coupled to the housing and the second end is coupled to the contoured backrest.

3. The seat of claim 2, wherein, in response to the seat pan pivoting into the deployed position, the tension cord is configured to deploy the contoured backrest into a second contoured shape by imparting tension to a location where the second end is coupled to the contoured backrest.

4. The seat of claim 1, wherein the seat pan and the contoured backrest are configured to stow at least partially in the housing in response to the seat pan being in the stowed position.

5. The seat of claim 1, further comprising a contoured pad coupled to an outer surface of the contoured backrest.

6. The seat of claim 1, wherein the contoured backrest is coupled to the housing via a slidable joint, allowing the contoured backrest to slide relative to the housing in response to the seat pan pivoting into the deployed position.

7. The seat of claim 1, further comprising a headrest coupled to a top of the housing and an at least one foot coupled to a bottom of the housing.

8. The seat of claim 1, wherein the contoured backrest comprises a stretch material coupled to an inner surface of the frame.

9. The seat of claim 1, further comprising a seat restraint coupled to the housing.

10. A method of operating the seat of claim 1, comprising:
    pivoting the seat pan into the deployed position, wherein in response to the seat pan being in the deployed position the deployment lever is configured to deploy the contoured backrest into the contoured shape, causing the flex point to bend in a direction away from the housing; and
    pivoting the seat pan into the stowed position, wherein in response to the seat pan being in the stowed position the deployment lever is configured to allow the contoured backrest to form into a relaxed shape.

11. A contoured stowable seat, comprising:
    a housing having a top and a bottom;
    a seat pan pivotably coupled to the housing at a position between the top and the bottom, wherein the seat pan is configured to pivot from a stowed position into a deployed position;
    a contoured backrest comprising a frame and a stretch material, wherein the stretch material is coupled to the frame and the frame defines an axially outer edge of the stretch material, and wherein the frame is coupled to the housing at a first position proximate the top of the housing and at a second position proximate where the seat pan couples to the housing;
    a tension cord having a first end and a second end, wherein the first end is coupled to the housing and the second end is coupled to the stretch material of the contoured backrest; and
    a deployment lever having a first deployment end and a second deployment end, wherein the first deployment end is coupled to the seat pan at a location proximate the coupling of the seat pan to the housing, and wherein the second deployment end is configured to contact the frame of the contoured backrest in response to the seat pan being in the deployed position, causing the contoured backrest to deploy into a contoured shape.

12. The contoured stowable seat of claim 11, further comprising a seat restraint coupled to the housing.

13. The contoured stowable seat of claim 11, wherein in response to the seat pan pivoting into the deployed position, the tension cord is configured to deploy the contoured backrest into a second contoured shape by imparting tension to a location where the second end is coupled to the contoured backrest.

14. The contoured stowable seat of claim 11, wherein the seat pan and the contoured backrest are configured to stow at least partially in the housing in response to the seat pan being in the stowed position.

15. The contoured stowable seat of claim 11, further comprising a contoured pad coupled to an axially outer surface of the stretch material of the contoured backrest.

16. The contoured stowable seat of claim 11, wherein the frame of the contoured backrest is coupled to the housing at the first position via a slidable joint, allowing the contoured backrest to slide relative to the housing in response to the seat pan pivoting into the deployed position.

17. The contoured stowable seat of claim 11, further comprising a headrest coupled to the top of the housing.

18. The contoured stowable seat of claim 11, wherein the frame further comprises a flex point configured to bend in a direction away from the housing, in response to the seat pan pivoting into the deployed position.

* * * * *